R. E. PYE.
CHAIN TIRE GRIP.
APPLICATION FILED MAR. 28, 1918.
1,339,978.
Patented May 11, 1920.
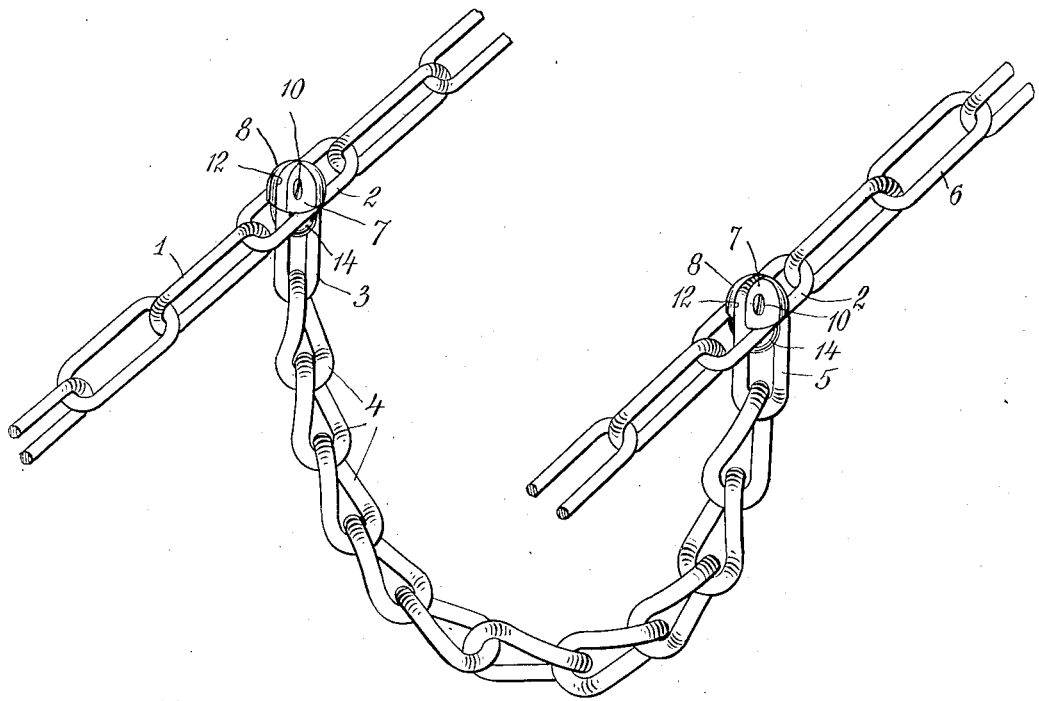
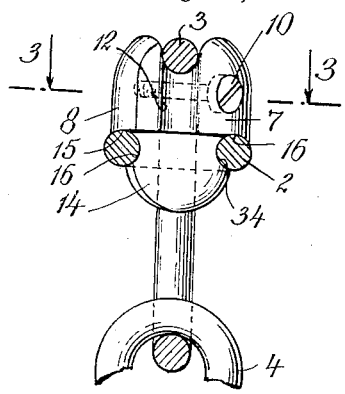
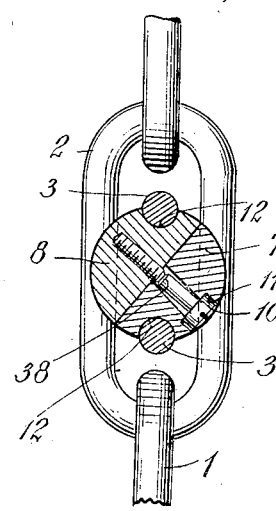
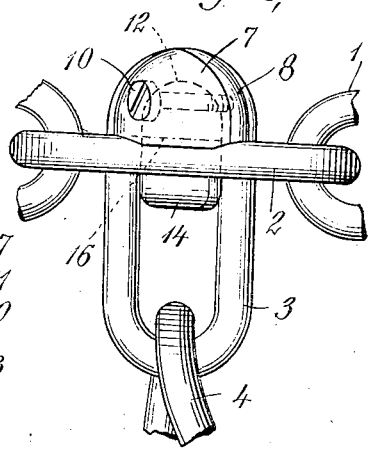
Inventor
Robert E Pye
By his Attorney
Harry L Duncan

UNITED STATES PATENT OFFICE.

ROBERT E. PYE, OF BRIDGEPORT, CONNECTICUT, ASSIGNOR TO AMERICAN CHAIN COMPANY, INCORPORATED, OF BRIDGEPORT, CONNECTICUT, A CORPORATION OF NEW YORK.

CHAIN TIRE-GRIP.

1,339,978.  Specification of Letters Patent.  Patented May 11, 1920.

Application filed March 28, 1918. Serial No. 225,242.

*To all whom it may concern:*

Be it known that I, ROBERT E. PYE, a citizen of the United States, and resident of Bridgeport, Fairfield county, State of Connecticut, have made a certain new and useful Invention Relating to Chain Tire-Grips, of which the following is a specification, taken in connection with the accompanying drawing, which forms part of the same.

This invention relates especially to chain tire grips of the Weed or Parsons type, and to tread chains and coöperating connectors therefor to readily and preferably disengageably connect the tread chains to the side chains of the grips. The tread chains in which the greatest wear and breakage occurs preferably have a connecting link at each end to be inserted through a corresponding holding link in the side chain of the grip and the two links held in such interlocked position by the two or more part connector device preferably formed with sockets for the connecting and holding links and diagonally divided so as to exert more or less of a wedging clamping action thereon. The sections of a two-part connector may be tightened and secured in desired relative position by a tightener screw preferably formed with a nicked or weakened portion so that it may be broken or forced apart and make the connector practically irreplaceable, so that it cannot readily be reused.

In the accompanying drawing showing in a somewhat diagrammatic way illustrative embodiments of the invention, Figure 1 is a perspective view showing the way in which a tread chain may be connected to the side chains.

Fig. 2 is an enlarged detail section of the parts adjacent the connector.

Fig. 3 is a transverse section thereof taken substantially along the line 3—3 of Fig. 2; and Fig. 4 is a side elevation thereof taken at right angles to Fig. 2.

The side chains 1, 6 of the tire grip are adapted to extend circumferentially around the wheel in the usual way and may be formed or provided with occasional straight links 2 to which the tread chains may be connected. The tread chains may be connected so that the desired number of tread chains are properly spaced around the wheel tire, and may comprise a greater or less number of curbed traction links 4 adapted to coöperate with the roadway; and preferably though not necessarily, straight connecting links, such as 3, 5, may be provided at the ends of the tread chain so as to be inserted through the holding links 2 of the side chains. The connector devices are arranged to grippingly or securely engage one or both of these coöperating interlocked links and hold them in this relation so as to securely connect the tread chain to the side chains. As shown the connector may be formed in two parts, 7 and 8, the line of severance being preferably along a somewhat diagonal plane which may extend through the longitudinal axis of the connecting link 3 and these two parts are held together and adapted to be tightened into gripping engagement with the holding link 2 as by a connector screw 10 which may have its head countersunk within a recess 11 in one of the connector elements, if desired. The connector may with advantage be formed with a connecting link socket 12 in which the link 3 may rest and more or less tightly fit, if desired, when the parts of the connector are brought forcibly together, as by driving the end of the link against the connector after it has been assembled and tightened in connection with the mid portion of the connecting link. The connector is also preferably formed with bridging shoulders 15, 16 and with an interposed tongue or central portion 14 adapted to pass between the sides of the holding link 2. For some purposes it is desirable to have the connector grippingly engage the holding link of the side chain and for this purpose retaining or gripping sockets 34 may be provided in the connector of such position and shape that if desired they may grippingly engage the holding link when the connector is tightened. For some purposes the connector may be made practically irreplaceable by forming the connector screw of small gage stock and having the threaded hole in the connector part 8 tightly engage the screw. In this way, while the screw can be forced home readily when the parts are new and be amply strong to hold the connector together during service, the usual rusting and corrosion is practically certain to cause such sticking as makes it impossible to unscrew the parts, although they may be readily disconnected by striking them with a hammer, for instance, the screw being, if desired, more or less nicked or weakened at the point 38 to facilitate this disengagement. In this way the tread chain may be sold with loosely attached connectors so that the tread chain can thus be readily attached for replacement and when the tread chain is to be disengaged a few blows of a hammer break the connector apart and at the same time render useless the threaded portion thereof in which the broken screw end is firmly engaged.

This invention has been disclosed in connection with a number of illustrative embodiments, forms, proportions, parts, materials, arrangements, methods of manufacture and use, to the details of which disclosure the invention is not of course to be limited, since what is claimed as new and what is desired to be secured by Letters Patent is set forth in the appended claims.

1. The tire grip consisting of side chains comprising straight sided holding links and coöperating tread chains having traction links at their central portions and straight sided connecting links at their ends, said connecting links being inserted within the holding links of said chains and two-part gripping connectors within the interlocked portions of said connecting and holding links to prevent their disengagement, said connectors comprising bridging shoulders and comprising connecting link sockets to be tightly engaged by said connecting links, and a nicked connector screw securely connecting the parts of said connector and render them substantially irreplaceable.

2. The tire grip consisting of side chains comprising holding links and coöperating tread chains having traction links at their central portions and connecting links at their ends, said connecting links being inserted within the holding links of said side chains and two-part gripping connectors within the interlocked portions of said connecting and holding links to prevent their disengagement, said connectors comprising bridging shoulders and comprising connecting link sockets to be engaged by said connecting links, and a connector screw securely connecting the parts of said connector.

3. The chain tread member for tire grips comprising central traction links and straight sided connecting links at the ends of said tread member and two-part gripping connectors adapted to hold said connecting links in interlocked position within the holding links of the side chains of a tire grip, said connectors comprising bridging shoulders and gripping retainer sockets to grippingly engage said holding links and comprising connecting link sockets to be engaged by said connecting links, the parts of said connectors having meeting faces extending diagonally substantially along the axis of said connecting links and a weakened connector screw having tight threaded engagement with one of the parts of said connector and countersunk within the other part to securely and substantially irreplaceably hold said connected parts in holding position.

4. The chain tread member for tire grips comprising central traction links and connecting links at the ends of said tread member and two-part gripping connectors adapted to hold said connecting links in interlocked position within the holding links of the side chains of a tire grip, said connectors comprising gripping retainer sockets to grippingly engage said holding links and a connector screw to hold said connected parts in holding position.

5. The tread member for tire grips comprising central traction members and straight sided connecting links at the ends of said tread member and multiple piece connectors detachably connected to said connecting links and adapted to hold said connecting links in interlocked position within the holding links of the side members of a tire grip, said connectors comprising bridging shoulders to engage said holding links and comprising connecting link sockets to be engaged by said connecting links, and a connector screw to secure said connector parts in holding position.

6. The tread member for tire grips comprising central traction members and connecting links at the ends of said tread member and multiple piece connectors detachably connected to said connecting links and adapted to hold said connecting links in interlocked position within the holding links of the side members of the tire grip.

7. The two-part connector adapted to be located within and hold the end connecting link of a tread chain in interlocked position within the link of the side chain of a tire grip, said connector comprising bridging shoulders and gripping retainer sockets to grippingly engage said holding link and comprising connecting link sockets to be tightly engaged by said connecting link, the parts of said connector having meeting faces extending diagonally substantially along the axis of said connecting link and a nicked connector screw having tight threaded engagement with one of the parts of said connector and countersunk within the other part to substantially irreplaceably secure said connector parts in holding position.

8. The two-part connector adapted to be located within and hold the end connecting link of a tread chain in interlocked position with the link of the side chain of a tire grip, said connector comprising bridging shoulders, the parts of said connector having meeting faces extending diagonally substantially along the axis of said connecting link and a connector screw having tight threaded engagement with one of the parts of said connector to substantially irreplaceably secure said connector parts in holding position.

9. The two-part gripping connector adapted to be located within and hold the end connecting link of a tread chain in interlocked position within the link of the side chain of a tire grip, said connector comprising bridging shoulders and gripping retainer sockets to grippingly engage said holding link and comprising connecting link sockets to be engaged by said connecting link, the parts of said connectors having meeting faces extending diagonally with respect to said connecting link and a connector screw to secure said connector parts in holding position.

10. The two-part gripping connector adapted to be located within and hold the end connecting link of a tread chain in interlocked position within the link of the side chain of a tire grip, said connector comprising bridging shoulders and gripping retainer sockets to grippingly engage said holding link and a connector screw to secure said connector parts in holding position.

11. The multiple piece connector adapted to be located within and hold the end connecting link of a tread chain in interlocked position within the link of the side chain of a tire grip, said connector comprising bridging shoulders and gripping retainer sockets to grippingly engage said holding link and comprising connecting link sockets to be engaged by said connecting link, the parts of said connector having meeting faces extending substantially along the axis of said connecting links and screw connecting means to securely and substantially irreplaceably hold said connector parts in holding position.

12. The multiple piece connector adapted to be located within and hold the end connecting link of a tread chain in interlocked position within the link of the side chain of a tire grip, said connector comprising bridging shoulders and gripping retainer sockets to grippingly engage said holding link and screw connecting means to hold said connector parts in holding position.

ROBERT E. PYE.

Witnesses:
 HENRY B. PERSON, Jr.,
 WILLIAM SIEGLER.